Fig. 12.

INVENTORS
LASZLO L. RAKOCZI &
BY ELI GLOATES
John V. Regan
ATTORNEY

INVENTORS
LASZLO L. RAKOCZI &
BY ELI GLOATES

John V. Regan
ATTORNEY

United States Patent Office 3,234,518
Patented Feb. 8, 1966

3,234,518
DATA PROCESSING SYSTEM
Laszlo L. Rakoczi, Merchantville, and Eli Gloates, Haddonfield, N.J., assignors to Radio Corporation of America, a corporation of Delaware
Filed Oct. 14, 1960, Ser. No. 62,644
1 Claim. (Cl. 340—172.5)

The present invention relates to a data processing system, and particularly to an improved arrangement for transferring data among registers in such a system.

A large scale digital computer includes a large number of devices such as memory units, arithmetic units, various peripheral equipments and so on which must communicate among one another. Each of these devices may have associated with it a register. The purpose of the register is to store the output information from the device and to receive input information from any other device. Each register includes an output gate through which the stored information must pass to reach another device and an input gate through which new information passes which is received by the device. The registers usually consist of a large number of flip-flops.

Communication between the various devices is usually by means of a common data transfer channel. This channel consists of a plurality of wires and is ordinarily termed a "bus."

In order to transfer information from one register through the bus to another register, a readout command pulse is applied to the output gate of the register from which it is desired to transfer information and a read-in command pulse is applied to the input gate of the register to which it is desired to transmit the information. The read-out and read-in command pulses enable the output and input gates, respectively, and must have a duration at least equal to the total delay introduced by the gates and the transmission bus. The pulse duration must also be sufficient to permit all of the information to pass. In other words, the read-in pulse must start before or during the occurrence of the first or fastest information pulse and must continue until the occurrence of the slowest or last information pulse.

In a practical computer, the physical locations in the computer of the devices to be communicated with differ. Some devices which communicate with each other may be close to one another and some quite far from one another. If the computer is a synchronous one, the read-out and read-in command pulses must be made sufficiently long to allow for the longest possible delay between the time information pulses leave the output gate of one register and reach the input gate of another register. This consumes considerable computer time since the read-in and read-out command pulse durations must conform to the longest possible data transmission time rather than the average data transmission time. The computer speed can be improved by using different control pulse generators to generate shorter command pulses for transmissions between registers which are closer to one another and longer commond pulses for transmission between registers which are further from one another. This approach, however, is expensive. Moreover, this approach is not workable in systems which can be expanded by adding additional peripheral equipment without changing the system general control area.

In the system of the present invention, the problem above is solved in the following way. The read-in and read-out pulses are initiated and the transfer of data from one selected register (hereafter termed a "transmitting" register) to another (hereafter termed a "receiving" register) begins. The data received by the receiving register is fed back to a bus and the fed-back data is compared with the data from the transmitting register. When the fed-back data is equal to the transmitted data, the read-in and read-out pulses are automatically terminated. Thus, the transfer of data is asynchronous in the sense that the control pulse duration is not fixed but depends only on the actual amount of time required to complete the transfer of the data.

The comparison of the data fed back from a receiving register with that transmitted from a transmitting register does not necessarily insure that all of the bits transmitted represent binary information. For example, if the binary digit "zero" is represented by the absence of voltage and the binary digit "one" by the presence of a voltage, then there is some ambiguity between the presence of a binary digit "zero" and the failure of a component in the circuit to generate a binary digit. In other words, the absence of a voltage on the wire of a bus may means the presence of information, i.e., a binary digit "zero" or it may mean the absence of a binary digit (a "bit" of information) on that wire.

An important feature of the present invention is the provision of means for sensing the absence of any bit of information from the data transferred between registers. The complement of the data transferred between registers is applied to a bus separate from the transmitting bus between the registers. The bits on this separate bus are compared with the bits transferred and, when corresponding bits are all of different value (complements of one another), the entire data is known to be present. However, if two corresponding bits are both binary "zero," then an information bit is known to be absent and the control pulse which commands the transfer of information between two registers is made to continue until the missing bit arrives or the decision is reached that an error is present.

A further check on the accuracy of information transferred between registers in a large scale computer is its "parity." In prior are computers, to insure that the information in the registers is correct, each such register may have associated with it a parity check circuit. While this arrangement is quite satisfactory, it is relatively expensive since several hundred parity circuits may be required.

According to a feature of the present invention, there are substituted for the parity check circuit for each register, one or two central parity check circuits which are common to all registers in the system. As is explained in more detail below, in the specific system described there are two buses to which a transmitting register may apply data and this requires two central parity checkers. Each central parity checker insures that the output gates of each transmitting register and the bus carrying the information from that transmitting register do not introduce any errors. The central parity checker does not check whether the input gates of a receiving register or the flip-flops of that receiving register introduce any errors. However, the comparator described above insures that the data stored in a receiving register is equal to the data transferred from a transmitting register so that this additional parity check is not required.

The invention is described in greater detail below and is illustrated in the accompanying drawings of which.

GENERAL

The individual blocks shown in the figures above are in themselves known circuits. The circuits of the blocks are actuated by electrical signals applied to the blocks. When the signal is at one level, it represents the binary digit "one" and when it is at another level, it represents the binary digit "zero." For the sake of the discussion which follows, it may be assumed that a high level signal represents the binary digit "one" and a low level signal the binary digit "zero." Also, to simplify the discussion, rather than speaking of an electrical signal being applied to a block or a logic stage, it is hereafter stated that a "one" or a "zero" is applied to the block or stage.

Throughout the figures, capital letters are, in some cases, small letters or Greek letters are used to represent a signal indicative of a binary digit. For example, X may represent the binary digit "one." A bar over a letter indicates the binary complement of the binary number or digits. In this case, $\overline{X}$ represents the binary digit "zero." In some cases, the letters are employed in Boolean equations as a convenient means for succinctly describing the circuit operation.

Various combinations of capital letters are also used in the description to identify leads and signals. As some examples, T1 refers to a control bus, made up of many wires, which only transmits data. RT1 is a control bus which both receives and transmits data. ROX2 identifies a pulse or voltage level which, when it represents the binary digit "zero," commands the $\overline{X}$ register to read-out information to bus RT2. SRXR identifies a pulse or voltage level which, when it represents the binary digit "one," commands register $\underline{X}$ to read-in information from the bus to which it is tied. Other combinations of letters are identified in the application as they arise.

Throughout the figures a logic circuit known as a multiple input "none" gate is used. A "none" gate produces a "one" output when all of the inputs to the gate are "zero" and a "zero" output when one or more of the inputs are "one." This gate may consist of an "and" gate which has an inverter in series with each of its input leads. Alternatively, a "none" gate may consist of an "or" gate followed by an inverter. The Boolean equation for a "none" gate having A and B inputs and a C output is $\overline{AB}=C$ or $\overline{A+B}=C$ and the truth table for the gate is:

| A | B | C |
|---|---|---|
| 0 | 0 | 1 |
| 0 | 1 | 0 |
| 1 | 0 | 0 |
| 1 | 1 | 0 |

FUNCTIONAL DESCRIPTION OF SYSTEM

Figure 1:
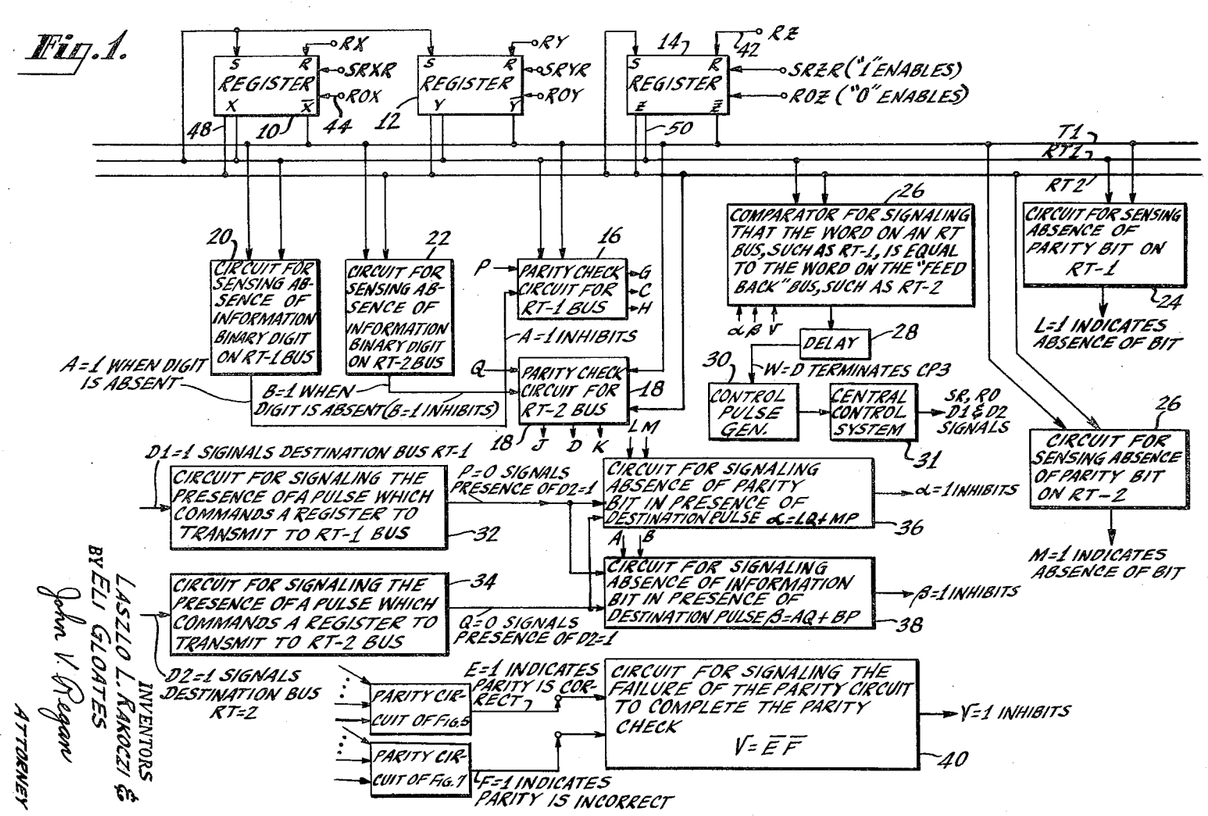
FIG. 1 is a functional block diagram of the system of the present invention.

A small portion which includes the invention of a large scale digital computer is shown in FIG. 1. To simplify the drawing, buses and other multiple conductors are shown by single leads. Also, only three of the registers in the computer are shown. It is to be understood that in a large scale computer there may be a hundred or more such registers. The registers illustrated are shown as receiving information from one of two buses and as applying information to several buses. In a large scale computer there may be other classes of registers. For example, there may be registers which receive data on one bus only but do not transmit. There are other registers which transmit data to a bus but do not receive data from any bus. These and other classes of registers are not illustrated since they are not necessary for an understanding of the invention.

Referring to FIG. 1, the communications channel for the data processing system consists of three buses T1, RT1, and RT2. T1 is for transmitting only. RT1 and RT2 are for receiving and transmitting. In other words, a bus such as RT1 may receive data from one register and apply it to another register. A bus such as T1 does not apply any information it receives from a register to another register.

Figure 2:
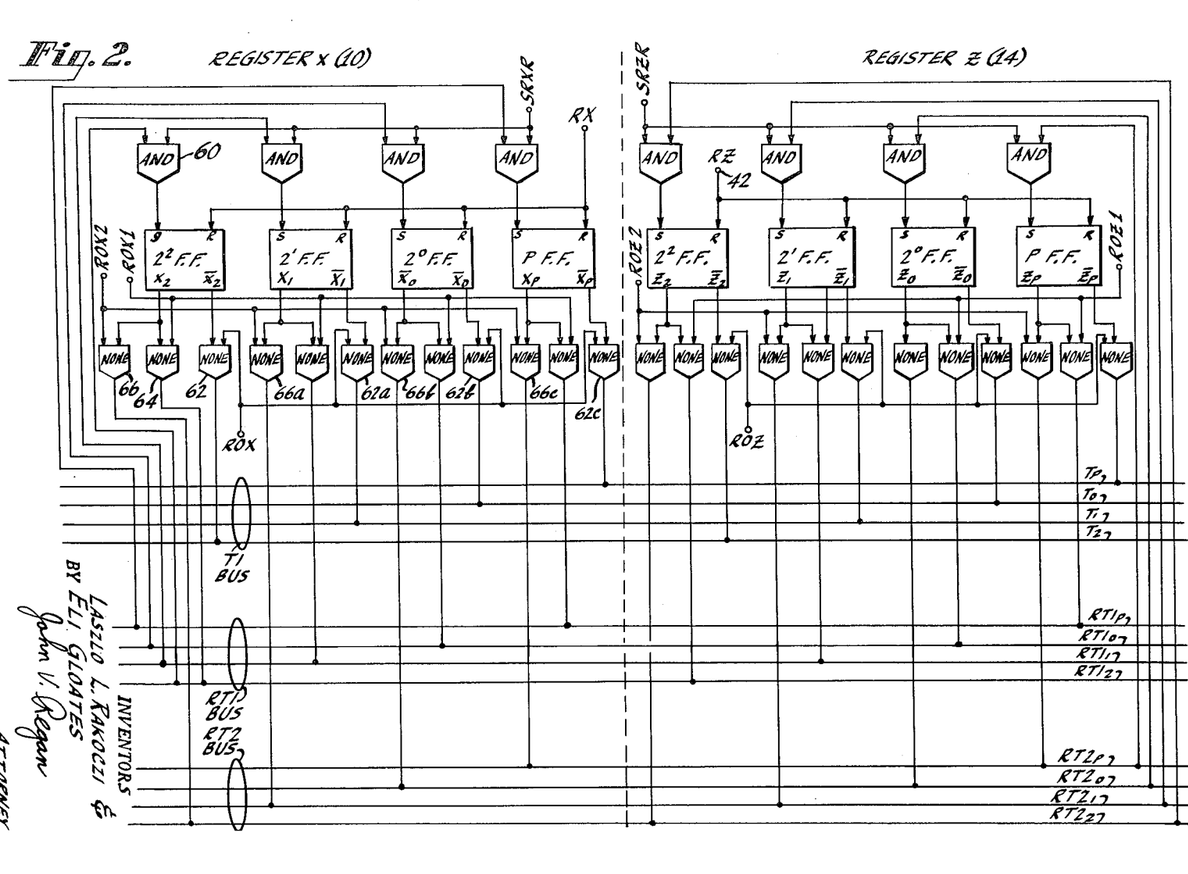
FIG. 2 is a block and schematic circuit diagram showing registers and buses through which the registers communicate.

Registers 10, 12 and 14 are connected to the bus. These registers are hereafter sometimes termed the X, Y, and Z registers, respectively, and the signals produced by the registers are, in general, designated by the same letters followed by various subscripts. Each register has associated with it an input gate and several output gates. These are not shown in FIG. 1 but are illustrated in FIG. 2. The unbarred output such as X of a register may be applied either to bus RT1 or bus RT2. The barred output such as $\overline{X}$ of a register is applied to bus T1.

A register may receive data either from bus RT1 or bus RT2. Registers 10 and 12 are connected to receive data from bus RT1 and register 14 is connected to receive data from bus RT2. The data is applied, in each case, through input gates to the set terminals of the flip-flops making up the register. Each flip-flop in each register also has associated with it a reset terminal. The set and reset terminals are illustrated in a general way in FIG. 1 by the letters S and R.

These are two parity check circuits 16 and 18 which are common to all of the registers in the data processing system. Parity check circuit 16 checks the parity of the data transmitted on bus RT1 and parity check circuit 18 checks the parity of the data transmitted on bus RT2. It will be seen from the drawing that each parity check circuit receives the data, hereafter termed a "word," from a RT bus and a complement of the word from the T bus.

The circuits illustrated by blocks 20 and 22 are for the purpose of sensing whether the digits of the words transmitted by buses RT1 and RT2, respectively, are all present. In brief, each circuit compares the digits of the word on an RT bus with the digits on the word on the T bus and, when corresponding digits are complementary, produces a "zero" output. However, if any two corresponding digits are both binary "zero," this indicates the absence of a binary digit, and a "one" output is produced. An A=1 output from block 20 or a B=1 output from block 22 inhibits the parity check circuit to which it is applied.

The circuits illustrated by blocks 24 and 26 at the right of the figure perform functions similar to that performed by circuits 20 and 22. However, the circuits of blocks 24 and 26 check the presence of parity bits on buses RT1 and RT2 whereas the circuits of blocks 20 and 22 check the presence of information bits on the same buses. As shown in the figure, an L=1 or M=1 output indicates the absence of a parity bit and these L and M signals are used to inhibit other stages as is explained in more detail later.

In the system of the invention, when a register such as 10 is commanded to transfer a word to another register, it transmits the word on one of the RT buses such as RT1. A receiving register connected to that bus, such as register 12, is commanded to receive the transmitted word. In response to the receipt of this word, the receiving register applies the received word through one of its output gates to a feedback bus which, in the present instance, would be bus RT2. The purpose of comparator circuit 26 is to compare the transmitted word with the received word which is fed back, to insure that they are equal. When they are, a signal is applied by circuit 26, through a delay line 28, to a control pulse generator 30, to terminate the read-out and read-in command pulses to the registers.

The circuits of blocks 32 and 34 are to determine the presence of bus destination pulses D1 and D2 which effectively direct the transfer of information stored in a register either to bus RT1 or RT2. The circuit of block 32, for example, produces a P=0 output when information is to be transferred into bus RT1 (D1=1). (The expression P=0 and similar expressions used hereafter is a shorthand way of saying a voltage level indicative of the binary digit "zero.") Similarly, the circuit of block 34 produces a Q=0 output when information is to be transferred into bus RT2 (D2=1).

The circuits of blocks 36, 38 and 40 are to generate signals for inhibiting the comparator in response to various logical conditions. For example, the circuit of block 36 generates an inhibit signal when there is a bus destination pulse present but no parity bit present on the selected bus. The circuit of block 38 generates an inhibit signal when there is a bus destination pulse present but an information digit is absent from the selected bus. The circuit of block 40 generates an inhibit signal when the parity circuit which is operative has failed to complete the parity check.

The system of the invention may be operated in the following manner. It is to be understood, of course, that the following description is a simplified version of a computer operating cycle. It is assumed that the instruction to the machine, which is applied to the central control system 31, is to read information out of register 10 and into register 14. The sequence of operations is controlled by a control pulse generator 30. It produces output pulses in response to a start control pulse generator command from the operating console. Some of these are synchronous (of fixed duration) and some are asynchronous (of controllable duration). A detailed description of a suitable control pulse generator for a large computer may be found in application Serial No. 31,335 by Paoletti and Rakoczi, filed May 24, 1960, now Patent No. 3,107,332 and assigned to the same assignee as the present invention. A simplified form of this generator is described later.

The first control pulse CP1 may be assumed to be of fixed duration and its purpose is to reset the register which is to store the instruction to be executed. This is described in more detail later in connection with FIG. 12.

The second control pulse CP2 enables the output gates of the program memory in system 31 and the memory transfers the instruction to be executed into the instruction register.

The third control pulse CP3 is asynchronous in nature, that is, it is of controllable duration. It enables the output gates of the instruction register, whereby various circuits in the central control system 31 generate the various SR, RO, and other signals. In the example chosen for illustration, that is, the transfer of data from register X to Z, the reset pulse RZ=1 for the Z register is generated. Thereafter, ROX=1 is applied to terminal 44 of register 10 and SRZR=1 is applied to terminal 46 of register 14. The ROX pulse or voltage level (actually two pulses, ROX2=0 and ROX=0) enables all of the output gates in register 10, leading to bus RT2 and all of the output gates leading to bus T1. In other words, X information flows from all of the flip-flops in register 10 via leads 48 to bus RT2. Also, all of the $\overline{X}$ information flows through other output gates of register 10 to bus T1. SRZR=1 enables all of the input gates of register 14. Thus, information flows from register 10 through leads 48 and bus RT2 into the input gates to register 14.

Circuits in central control system 31, to be discussed in more detail later in connection with FIGS. 12–16, sense when the input gates to the register are enabled and, in response to the enabling of these gates, enable the output gates of register 14 leading to bus RT1. In other words, the gates in register 14 which are in series with leads 50 are enabled. Register 14 receives the information flowing through its input gates, stores this information, and at the same time applies the information through leads 50 to bus RT1. Bus RT1, in this instance, is a "feedback" bus.

Parity check circuit 18 checks the parity of the word transmitted from register 10 via leads 48 to bus RT2. Since this parity check occurs in the signal path after the output gates of register 10, it can only determine that the flip-flops in register 10 are operating properly and the output gates of register 10 are operating properly. It also determines, with the aid of the circuits of block 22, that all of the information digits are transferred from the register to the bus RT2.

The comparator 26 compares the word on bus RT2 with the word feed back by register 14 to bus RT1. Since the parity of the word on bus RT2 is known to be correct, if the word on bus RT1 is equal to the word on RT2, the parity of the word on RT1 is also assumed to be correct. Accordingly, the comparator 26 insures not only that the parity of the received word is correct but also that the received word is the same as, that is, equal to the transmitted word. It might be mentioned here that the use of a comparator in combination with a parity checker is a rather powerful technique since it insures much greater accuracy than the use of a single parity checker. Put another way, the use of a single parity checker will not detect two errors which cancel one another but the use of a parity checker and a comparator may catch such errors. For example, if the word coming out of the transmitting register is correct but the receiving register introduces two errors in the word such that the parity of the word remains correct, the comparator will detect these errors.

When the comparator determines that the received word is equal to the transmitted word, it sends a signal back through delay means 28 to the control pulse generator 30 to terminate control pulse CP3. This, in turn, terminates the read-out and read-in command pulses ROX and SRZR. Thus, the time which it is necessary to set aside for completing the transfer of a piece of information is only as long as is needed to complete and check the actual transfer. If the two registers are close to one another, the transfer time is made short and if the two registers are far from one another, the transfer time is made longer. The time of transmission between two registers on a statistical basis is therefore the average transmission time and need not be sufficiently long to permit the "worst case condition" as in the prior art.

As already mentioned, a further feature of the invention is the provision of inhibiting signals to the comparator for preventing the comparator from terminating the control pulses CP3 when certain inconsistent conditions are present. When a read-out pulse is present, the parity bit should be present, the information bits should be present, and the parity check should be correct and completed. If any of these conditions have not occurred, the comparator does not signal termination of a control pulse. The last control pulse CP4 is applied to the program memory in the central control system 31. Its function is to advance the memory to the next instruction.

REGISTERS AND BUSES

In a practical computer in which a circuit like the one of the present invention may be employed, a word may include 28 binary digits, 27 of which are information digits and one of which is a parity digit. In this event, each bus in the system has 28 wires, 27 for information digits and one for the parity digit, and each register has 28 flip-flops.

For the purposes of the present discussion, the circuits above are simplified. Thus, each register is shown as having only four flip-flops (three for information bits and one for a parity bit) and each bus as having only four wires. The principle of operation is, however, the same.

Referring now to FIG. 2, only two of the three registers in FIG. 1 are illustrated. Since both registers are basically similar, only one of them is described in detail and since each flip-flop stage in each register is identical, only one such stage and its associated gates are described in detail.

Registers X and Z (10 and 14) each include four flip-flops. These are legended 52, 54, 56 and 58 in the X register. Flip-flop 52 is for generating a parity digit and flip-flops 54, 56 and 58 are for generating information digits. The flip-flop generating the information digit of least significance is legended "$2^0$FF," the flip-flop generating the digit of next higher significance is legended "$2^1$FF," and the last flip-flop is legended "$2^2$FF."

An "and" gate 60 applies its output to the set terminal of flip-flop 58. When set, a "1" appears at the "not" terminal $\bar{X}_2$ of flip-flop 58. The other flip-flops operate in the same manner. The $\bar{X}_2$ output of flip-flop 58 is applied through a "none" gate 62 to the $T_2$ wire of bus T1. The $X_2$ output of flip-flop 58 may be applied through "none" gate 64 to the $RT1_2$ wire of bus RT1 or through "none" gate 66 to the $RT2_2$ wire of bus RT2. In like manner, the $2^1$FF applies its $\bar{X}_1$ output through a "none" gate to the $T_1$ wire of bus T1 and its $X_1$ output either to the $RT1_1$ wire of bus RT1 or the $RT2_1$ wire of bus RT2 and so on.

The input "and" gates of the flip-flops of register X receive their inputs from the RT1 bus and the "and" gates of register Z receive their inputs from the RT2 bus.

In operation, when it is desired to read-out information from register X to the RT2 bus, ROX2=0 is applied to "none" gates 66, 66a, 66b and 66c. When it is desired to read out information from the X register to the RT1 bus, a command ROX1=0 is applied to "none" gate 64 of flip-flop 58 and to the corresponding "none" gates of the other flip-flops. Whenever a command ROX1=0 or ROX2=0 is applied to register X, a corresponding command ROX=0 is applied to "none" gates 62, 62a, 62b and 62c of the register. Thus, whenever a word is read out of register X to bus RT1 or RT2, the complement of the word is read out to bus T1.

In order to read-in a word from a bus to a register, SR..R=1 is applied to the "and" gates of that register. Thus, if it is desired to read information from bus RT2 into register Z, SRZR=1 is applied to the "and" gates of that register. As already mentioned, before a unit of information is read into a register, the register is reset. This is done by applying a reset command such as RZ=1 to a terminal such as 42. When the flip-flops in a register are reset, their unbarred output terminals produce a "one" output.

INHIBIT CIRCUITS

Figure 3:
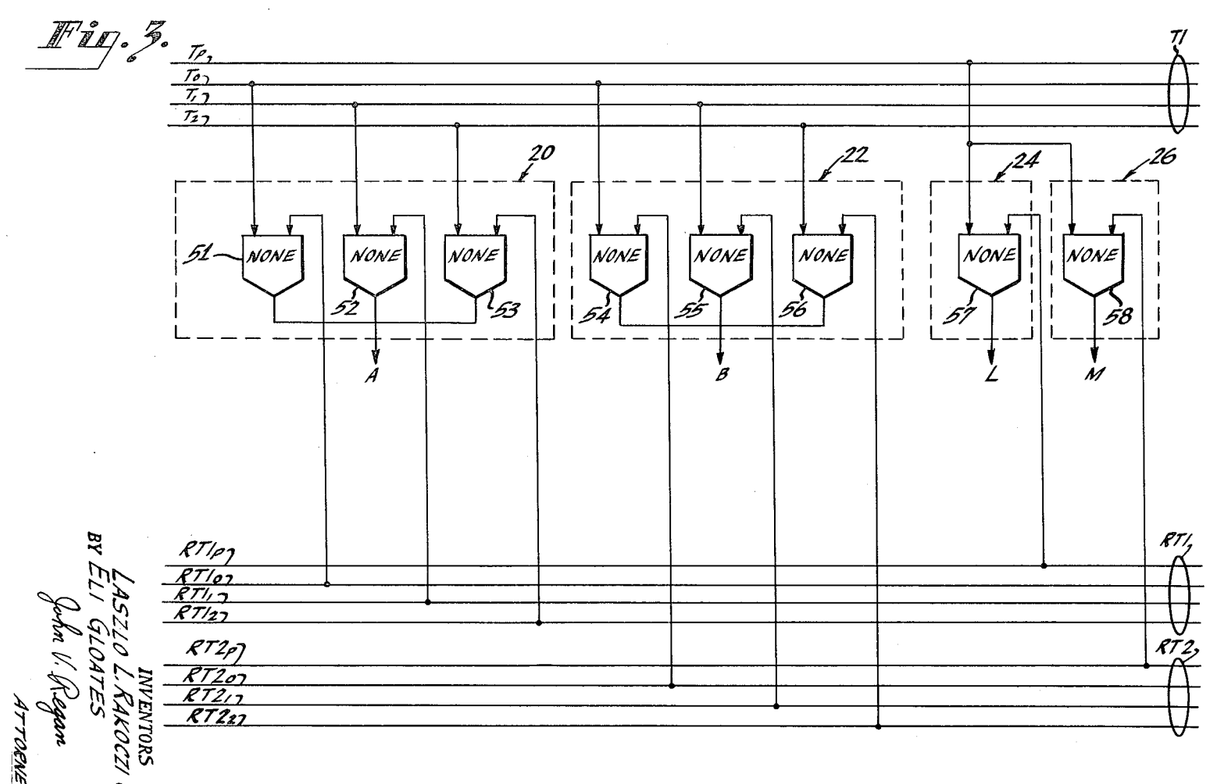
FIG. 3 is a block diagram of the circuit for means for sensing the absence of information of parity bits.

The circuits for checking whether or not information is present on a bus are shown in FIG. 3. "None" gates 51, 52 and 53 are connected between corresponding wires of buses RT1 and T1. As already mentioned, the wires on bus RT1 carry the digits of a word and the wires of bus T1 carry the complements of the digits. If a wire such as $T_0$ is carrying the binary digit "one" and a wire such as $RT1_0$ is carrying the binary digit "zero," "none" gate 51 produces a "zero" output. In like manner, if complements are present on the other wires of the two buses T1 and RT1, "none" gates 52 and 53 also produce "zero" outputs. However, if a wire such as $T_0$ and its corresponding wire $RT1_0$ each are carrying the binary digit "zero," indicating the absence of a bit of information, "none" gate 51 produces a "one" output. If any one of "none" gates 51, 52 or 53 produce a "one" output, then A=1. Accordingly, A=1 indicates the absence of a binary digit on one of the wires (other than the parity bit wire) of the RT1 bus.

"None" gates 54, 55 and 56 compare the digits on bus T1 with those on bus RT2. B=1 indicates that at least two corresponding wires of buses T1 and RT2 are carrying the binary digit "zero" rather than complementary digits. Therefore, B=1 indicates that a bit of information is absent from the RT2 bus.

"None" gates 57 and 58 determine whether the parity digit is present or not. L=0 indicates that a parity digit is present on bus RT1 and M=0 indicates that the parity digit is present on bus RT2. Correspondingly, L=1 indicates the absence of a parity digit from bus RT1 and M=1 indicates the absence of a parity digit from bus RT2.

PARITY CIRCUITS

A parity circuit suitable for a large scale digital computer having a word length of 28 bits is described in application Serial No. 34,939 for Computer Circuits, filed June 9, 1960 by W. J. Gesek and L. L. Rakoczi and assigned to the same assignee as the present invention. A simplified circuit embodying certain of the features of this parity circuit is illustrated in FIGS. 4–7 and described below.

Figure 4:
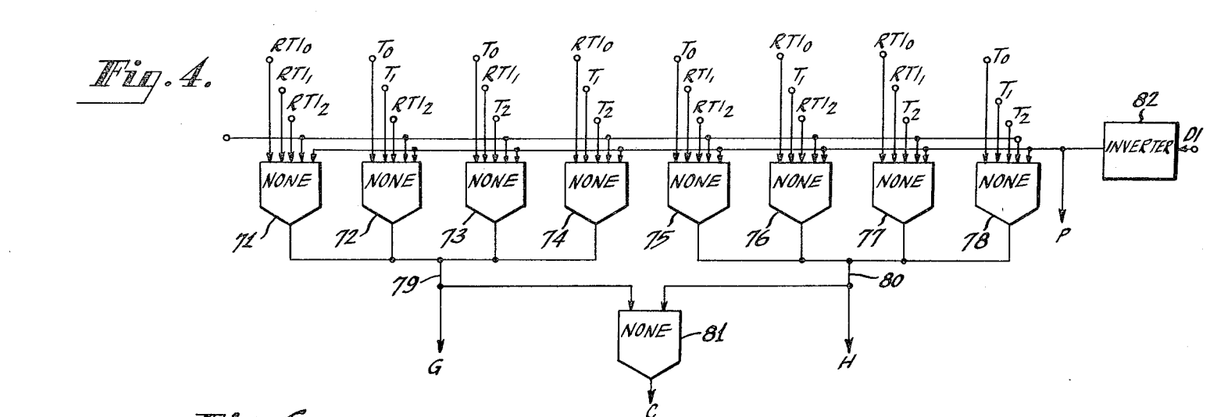
FIGS. 4 and 6 are block diagrams of circuits for determining whether there are an odd or an even number of "ones" in the words on the RT1 and RT2 buses, respectively.

The circuit of FIG. 4 includes eight "none" gates 71–78 inclusive, four connected to one common output lead 79 and four connected to another common output lead 80. Here and other places in the circuit, multiple connections to a common point or lead may be thought of as performing the logic "or" function. Lead 79 serves as one input to "none" gate 81 and lead 80 serves as the other input to "none" gate 81.

The inputs to "none" gates 71–78 are from various wires of buses RT1 and T1. These are appropriately labeled. A fourth input to each "none" gate is the A output of the circuit shown in FIG. 3 which senses whether or not all of the information is present on the RT1 bus. A, it will be recalled, is a signal derived from one of the circuits in FIG. 3. When A=0, indicating all information bits on the RT1 bus are present, "none" gates 71–78 are enabled.

A fifth input to "none" gates 71–78 is the P output of an inverter 82. The input to inverter 82 is D1, the command which indicates whether or not data is to be applied from one of the registers to the RT1 bus. The circuits from which the D1 (and D2) pulses are derived are in the central control system and are discussed later in connection with FIG. 12. D1=1 indicates that data is to be transferred to bus RT1 and produces a P=0 pulse. P=0 enables "none" gates 71–78.

Assuming now that A=0 and P=0, the circuit of FIG. 4 operates according to the following truth table. In the truth table, the legends $RT1_0$ and $RT1_1$ and $RT1_2$ represent the value of the binary digit of information present on the corresponding wire.

| $RT1_0$ | $RT1_1$ | $RT1_2$ | G | H | C | Conducting Gate |
|---|---|---|---|---|---|---|
| 0 | 0 | 0 | 1 | 0 | 0 | 71 |
| 1 | 1 | 0 | 1 | 0 | 0 | 72 |
| 1 | 0 | 1 | 1 | 0 | 0 | 73 |
| 0 | 1 | 1 | 1 | 0 | 0 | 74 |
| 1 | 0 | 0 | 0 | 1 | 0 | 75 |
| 0 | 1 | 0 | 0 | 1 | 0 | 76 |
| 0 | 0 | 1 | 0 | 1 | 0 | 77 |
| 1 | 1 | 1 | 0 | 1 | 0 | 78 |

From the truth table above, it may be seen that when there are an odd number of "ones" in a word, H=1 and G=0. In like manner, when there are an even number of "ones" in the word, G=1 and H=0. The binary digits G and H are applied to "none" gate 81. A C=0 output indicates that the parity information has passed through "none" gates 71–78 and that the G and H outputs are complementary. On the other hand, if C=1, it indicates one of the following:

(1) One, or more, of the information bits has not passed from the RT1 bus or the T1 bus through a "none" gate of the circuit of FIG. 4.

(2) That P=1—this indicates that the destination pulse D1 for bus RT1 is absent.

(3) That A=1—this indicates that at least one information bit is absent from the RT1 bus.

Figure 6:
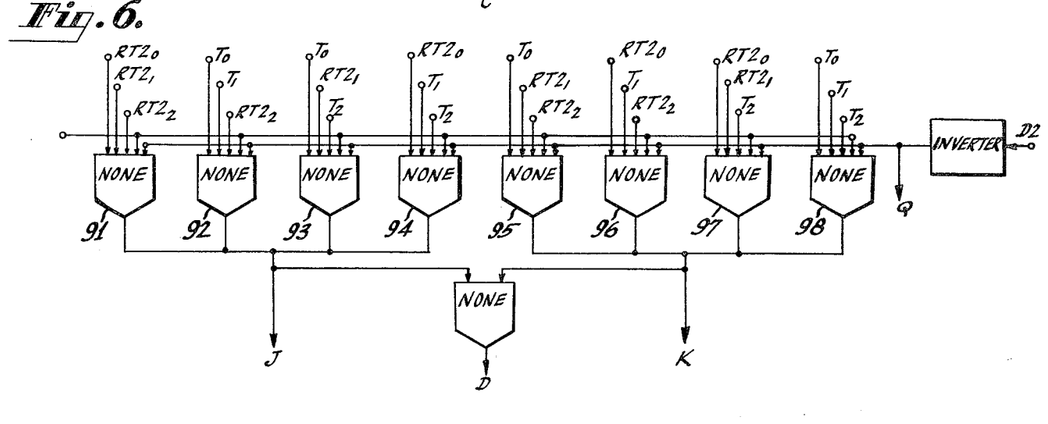

The circuit of FIG. 6 performs the same function for bus RT2 that the circuit of FIG. 4 performs for bus RT1. The truth table for the circuit of FIG. 6 is as follows:

| $RT2_0$ | $RT2_1$ | $RT2_0$ | J | K | D | Conducting Gate |
|---|---|---|---|---|---|---|
| 0 | 0 | 0 | 1 | 0 | 0 | 91 |
| 1 | 1 | 0 | 1 | 0 | 0 | 92 |
| 1 | 0 | 1 | 1 | 0 | 0 | 93 |
| 0 | 1 | 1 | 1 | 0 | 0 | 94 |
| 1 | 0 | 0 | 0 | 1 | 0 | 95 |
| 0 | 1 | 0 | 0 | 1 | 0 | 96 |
| 0 | 0 | 1 | 0 | 1 | 0 | 97 |
| 1 | 1 | 1 | 0 | 1 | 0 | 98 |

As can be seen from the truth table above, J=1 and K=0 indicates an even number of "ones" in the word on bus RT2; K=1, J=0 indicates an odd number of "ones" in the word on bus RT2. D=0 indicates that J and K are complementary and therefore indirectly indicates that the digits have passed through "none" gates 91–98. Q=0 indicates that the destination pulse D2 for bus RT2 is present.

Figure 5:
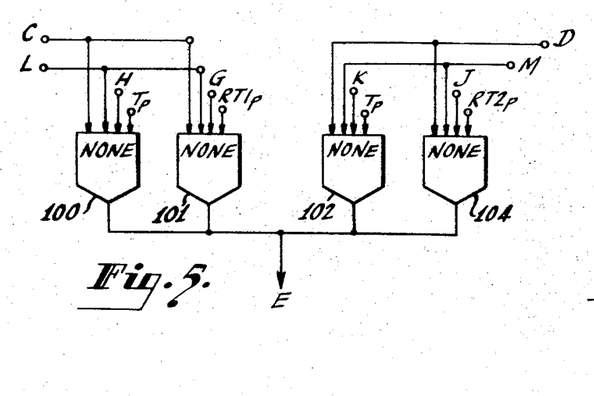
FIGS. 5 and 7 are the parity check circuits associated with the circuits of FIGS. 4 and 6.

The circuit of FIG. 5 cooperates with the circuits of FIG. 4 and FIG. 6. The circuit of FIG. 5 includes four "none" gates 100–104. The operation of this circuit may be defined by the following Boolean equation:

$$E=\overline{CL}[\overline{H}(T_p)+\overline{G}(\overline{RT1}_p)]+\overline{DM}[\overline{K}(T_p)+\overline{J}(\overline{RT2}_p)]$$

Put into words, the Boolean equation above says that when C=0 (all information is present in the parity circuit of FIG. 4), and L=0 (a parity bit is present on bus RT1—see FIG. 3), and H=0 (there are an even number of "ones" in the word—see FIG. 4), and $T_p$=0 (the parity binary bit on the RT1 bus is "one"—see FIG. 4), then E=1 (parity is correct). In other words, when E=1, the parity is correct.

The equation above also states that when C=0, L=0, G=0 (there are an odd number of "ones" in the word), and $RT1_p$=0 (the parity binary digit on the RT1 bus is "zero), then E=1 (parity is correct).

In like manner, the remainder of the equation may readily be worked out by recalling that:

D=0 indicates that all bits have arrived at the last stage of the parity circuit of FIG. 6;

M=0 indicates that there is a parity bit present on bus RT2;

K=0 indicates there are an even number of "ones" in the word (FIG. 6);

J=0 indicates an odd number of "ones" in the word (FIG. 6); and $RT2_p$=0 indicates a parity binary digit "zero" on bus RT2.

Figure 7:
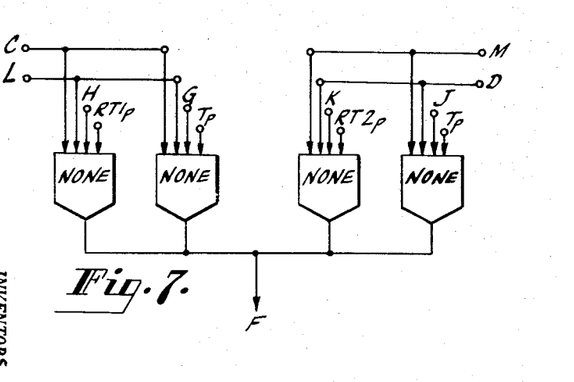

The circuit of FIG. 7 cooperates with the circuits of FIG. 4 and FIG. 6 and is analogous to the one of FIG. 5. The Boolean equation defining the operation of this circuit is:

$$F=\overline{CL}[\overline{H}(\overline{RT1}_p)+\overline{G}(T_p)]+\overline{MD}[\overline{K}(\overline{RT2}_p)+\overline{J}(T_p)]$$

The analysis of this equation follows readily from the analysis of the equation for E above. F=0 when E=1, and F=1 when E=0. F=1 when parity is incorrect.

This signal may be used to trigger an accuracy control circuit and an alarm indicator in the data processing system. The accuracy control circuit initiates a diagnostic routine, in case of incorrect parity, the purpose of which is to check all the logical elements in the transmitting register. This may be done, for example, by sending certain known binary bit patterns through the register and then checking the register output for missing bits. This accuracy control circuit is not part of the present invention and is therefore not discussed further.

Figure 8:
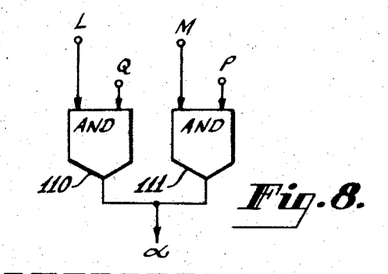
FIGS. 8, 9 and 10 are block diagrams of circuits for inhibiting or enabling the comparator circuit in response to different circuit conditions.
Figure 9:
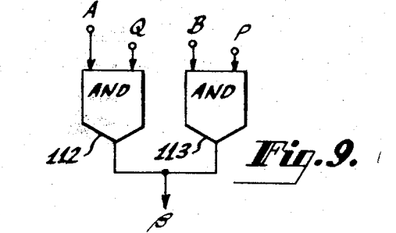

The inhibit circuits of FIGS. 8 and 9 each include two "and" gates. They are legended 110 and 111 in FIG. 8, and 112 and 113 in FIG. 9. The Boolean equation expressing the operation of the circuit of FIG. 8 is $\alpha=LQ+MP$. Put into words, when L=1 (a parity digit missing from bus RT1) and Q=1 (the bus RT2 destination pulse is absent (D2=0), which indirectly states that the bus RT1 destination pulse is present (D1=1), then $\alpha$=1. Alternatively, when there is a destination pulse D2 present for bus RT2 (D2=1 and P=1) and a parity bit missing from bus RT2 (M=1), then $\alpha$=1.

The Boolean equation expressing the operation of the circuit of FIG. 9 is $\beta=AQ+PB$. This states that $\beta$=1 when a destination pulse for bus RT1 is present and an information bit is missing from bus RT1 or when there is a destination pulse for bus RT2 present and an information bit is missing from bus RT2.

Figure 10:
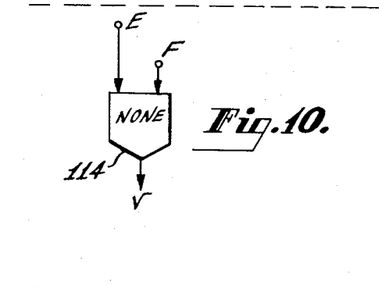

The inhibit circuit of FIG. 10 includes a "none" gate 114. The Boolean equation expressing the operation of the circuit is $\gamma=\overline{EF}$. Put into words, this means that $\gamma$=1 when the parity indication has not yet arrived at the final stage of the parity check circuit. (E and F are not complements—FIGS. 5 and 7.)

COMPARATOR CIRCUIT

Figure 11:
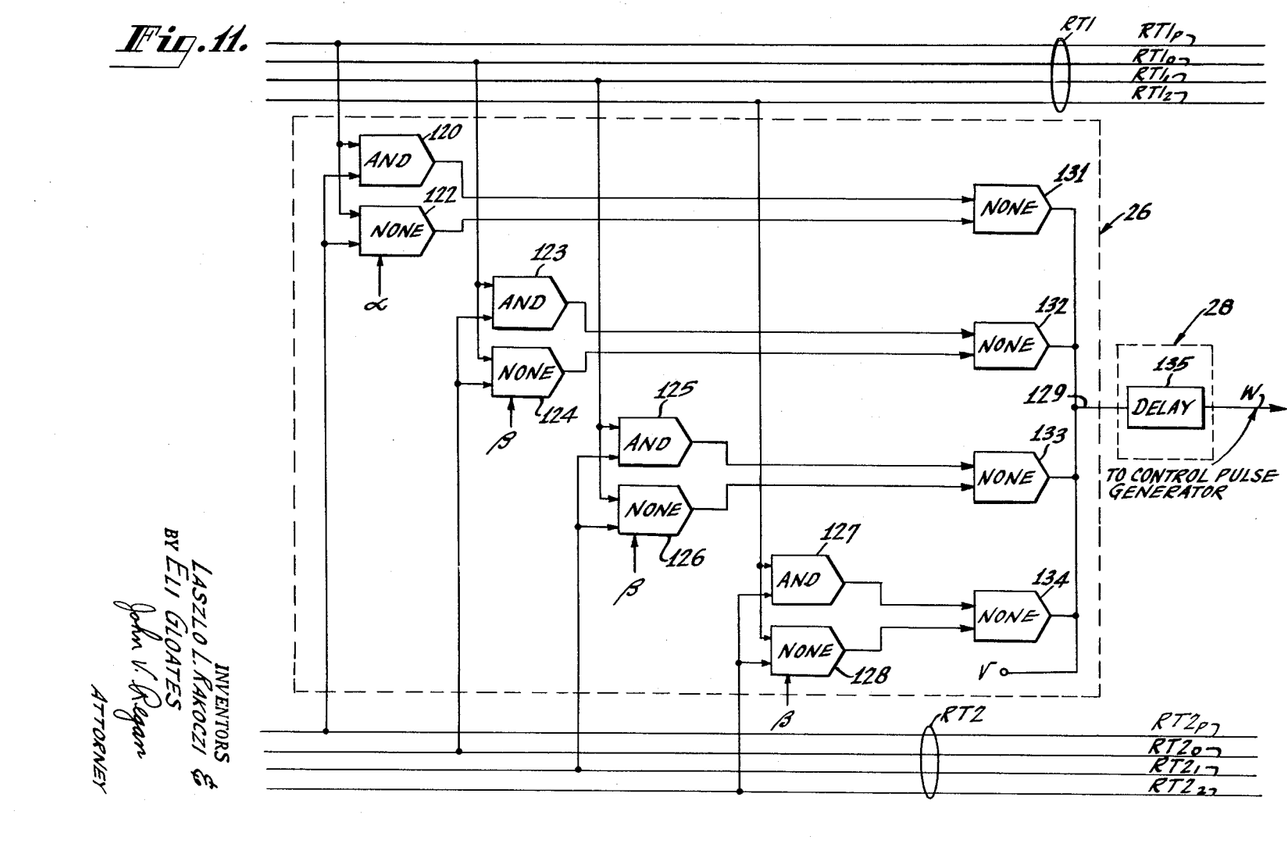
FIG. 11 is a block diagram of the comparator circuit of the invention.

The comparator circuit 26 is shown in FIG. 11. It includes four pairs of gates, each pair consisting of one "and" gate and one "none" gate. Each pair of gates receives two inputs from buses. For example, the first pair of gates consists of "and" gate 120 and "none" gate 122. "And" gate 120 receives an input from wire $RT1_p$ of bus RT1 and an input from wire $RT2_p$ of bus RT2. "None" gate 122 receives the same two inputs. The three other pairs of "none" gates are legended 123, 124; 125, 126; and 127, 128. Gates 123 and 124 receive inputs from wires $RT1_0$ and $RT2_0$; and gates 125 and 126 receive inputs from wires $RT1_1$ and $RT2_1$; and gates 127 and 128 receive inputs from wires $RT1_2$ and $RT2_2$.

The output of each pair of gates is applied to a "none" gate. Since there are four pairs of "and" "none" gates, there are four output "none" gates. These are legended 131–134, inclusive. The last-named "none" gates are "ored" together at a common connection 129. The output available at lead 129 is applied through a delay means 135 to the control pulse generator.

The output of the comparator of FIG. 11 is normally a "one." When the output switches to "zero," a pulse is applied back to the control pulse generator which terminates the asynchronous control pulse CP3 which commands the transfer of data between registers. In order to produce a W=0 output from the comparator circuit the following conditions must be met:

$\alpha$=0. This indicates that when there is a destination pulse for bus RT2 (D2=1 and Q=0), a parity bit is present on bus RT2 (M=0) or when there is a destination pulse for bus RT1 (D1=1 and P=0), a parity bit is present on bus RT1 (L=0).

$\beta$=0. This indicates that when there is a destination pulse for bus RT2 (D2=1 and Q=0), information bits are present on all of the wires of this bus (B=0) or when there is a destination pulse for bus RT1 (D1=1 and P=0), information bits are present on all of the wires of bus RT1 (A=0).

$\gamma=0$. This indicates that a parity indication has arrived at the output of the circuit of FIG. 5 ($E=1$ parity is correct) or a parity indication has arrived at the circuit of FIG. 7 ($F=1$ parity is incorrect).

If $\alpha$ is "one," then the output of "none" gate 122 is "zero." If the output of "none" gate 122 is "zero," than at least one input to "none" gate 131 is a "zero" and if the other input to "none" gate 131 becomes a "zero," then the output of "none" gate 131 becomes a "one."

"And" gate 120 is connected to wires $RT1_p$ of bus of RT1 and $RT2_p$ of bus RT2. If the digits on these two wires are "zero," the output of "and" gate 120 is a "zero" and the output of "none" gate 131 is a "one." If the digit on one of the wires is a "zero" and the digit on the other of the wires is a "one," the output of "and" gate 120 is a "zero" and the output of "none" gate 131 is a "one." Since $\alpha=1$, the condition a binary "one" on $RT1_p$ at the same time that a binary "one" is present on $RT2_p$ is not possible. It should be recalled, in this connection, that $\alpha=1$ is possible only when L is "one" or M is "one" and L is "one" only when the parity digit on RT1 is "zero" and the complement of the parity digit on T1 is "zero" and M is "one" only when the parity digit on RT2 is "zero" and the complement of the parity digit on T1 is "zero." Summarizing, when $\alpha=1$ or $\beta=1$ or $\gamma=1$, the output at lead 129 remains "one."

When $\alpha=0$, and the two digits compared by the "and" and "none" gates 120, 122 are "one," then there is a "one" output from the "and" gate and a "zero" output from the "none" gate so that there is a "zero" output from "none" gate 131. In like manner, when the two digits compared are "zero," there is a "zero" output from "and" gate 120 and a "one" output from "none" gate 122 so that the output from "and" gate 131 is a "zero." It is therefore clear that when all of the digits on the two buses are equal, all of the "and" gates 131–134 produce a "zero" output and since $\gamma$ is also "zero," lead 129 switches from "one" to "zero."

The "zero" output available on lead 129 is applied through delay line 135 to the control pulse generator (FIG. 1). This circuit terminates the read-in and read-out pulses to the registers transmitting information between one another. The purpose of the delay means 135 is to insure sufficient time for the control pulse to set a flip-flop before it is turned off. In other words, the minimum control pulse interval is equal at least to the delay imparted by the delay means 135.

CENTRAL CONTROL SYSTEM

The central control system of block 31 of FIG. 1 is shown in greater detail in FIGS. 12–16. In a large scale digital computer in which there may be hundreds of registers, the central control system is capable of generating several hundred selection pulses. For the purposes of the present discussion, however, the control system is shown in simplified form and it generates selection pulses for the three registers illustrated in FIG. 1.

Figure 12:
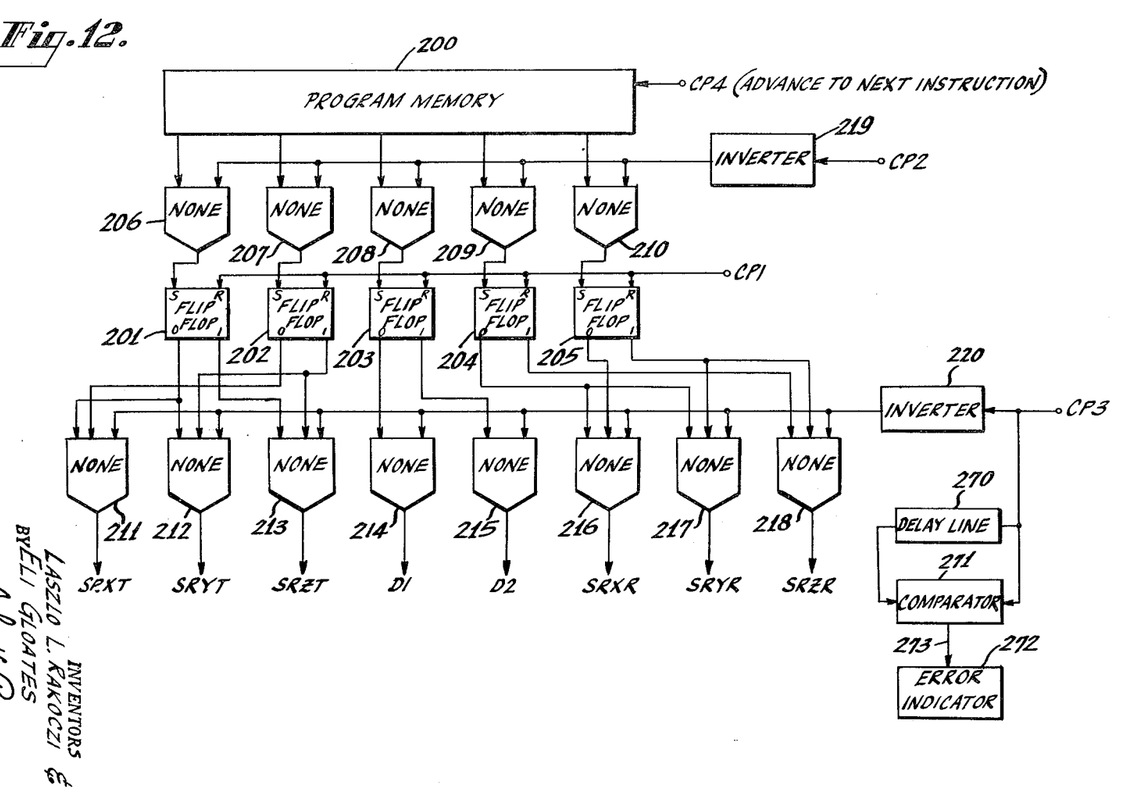
FIGS. 12–16 are block diagrams of the central control system shown as a single block in FIG. 1.

FIG. 12 should be referred to first. The program memory 200 stores the various instructions to be executed in the computer. The memory may be of the magnetic core or any other commonly used type with a flip-flop register as the output stage of the memory. The instructions determine the registers among which the various data are to be transferred. The instruction stored in a memory is applied to a register consisting of five flip-flops, 201, 202, 203, 204 and 205 through output "none" gates 206, 207, 208, 209 and 210, respectively. The "one" and "zero" outputs of the flip-flops are applied to various of the eight "none" gates 211–218 in the manner shown.

The operation of the system of FIG. 12 is controlled by control pulses from the control pulse generator 30 of FIG. 1. The first control pulse $CP1=1$ is applied to the registers 201–205 which contains the instruction to be executed. This control pulse resets all of the flip-flops of the register.

The second control pulse $CP2=1$ is applied through an inverter 219 to all of the output "none" gates 206–210 of the program memory. The purpose of the pulse is to enable these "none" gates and to thereby permit the instruction stored in the memory to be applied to the register 201–205.

The third control pulse $CP3=1$ is asynchronous, that is, its duration depends upon the length of time required for a word to be transferred from one selected register to another. Control pulse CP3 starts when control pulse CP2 ends and control pulse CP3 ends when the data transfer has been completed.

Control pulse $CP3=1$ is applied through an inverter 220 to "none" gates 211–218 and serves to enable these "none" gates.

"None" gates 211–218 are capable of producing the signals listed below:

$SRXT=1$—select register X for transmission
$SRYT=1$—select register Y for transmission
$SRZT=1$—select register Z for transmission
$SRXR=1$—select register X for reception (the same pulse commands the input gates of register X to receive data)
$SRYR=1$—select register Y for reception (the same pulse commands the input gates of register Y to receive data)
$SRZR=1$—select register Z for reception (the same pulse commands the input gates of register Z to receive data)
$D1=1$—destination is bus RT1 for information transmitted from a selected register
$D2=1$—destination is bus RT2 for information transmitted from a selector register The flip-flops of the registers 201–205 are so connected to the "none" gates 211–218 that a "one" output can be produced only by one of the three gates 211–213; a "one" output can be produced only by one of the two "none" gates 214 and 215; and a "one" output can be produced only by one of the three "none" gates 216–218. A "none" gate produces a "one" output only when all of the inputs to that gate are "zero." "None" gates 211 and 212 are connected to the "zero" output terminal of flip-flop 201 whereas "none" gate 213 is connected to the "one" output terminal of 201. Accordingly, "none" gate 213 cannot produce a "one" output at the same time "none" gates 211 and 212 produce a "one" output. "None" gate 211 is connected to the "zero" output of flip-flop 202 whereas "none" gate 212 is connected to the "one" output of flip-flop 202. Accordingly, "none" gate 211 cannot produce a "one" output at the same time that "none" gate 212 produces a "one" output. Finally, "none" gates 212 and 213 are connected to the "one" output terminal of flip-flop 202 whereas "none" gate 211 is connected to the "zero" output terminal of flip-flop 202. Accordingly, "none" gate 211 cannot produce a "one" output at the same time as "none" gates 212 and 213. The circuit can be traced for the other "none" gates with similar results.

Summarizing, the circuit of FIG. 12 produces a transmission selection pulse for one and only one of the registers in the system; it produces a reception selection pulse for one and only one of the registers in the system; it produces a destination pulse for one and only one of the two RT buses. As an example, the circuit of FIG. 12 may produce pulses $SRXT=1$, $D2=1$ and $SRZR=1$. These pulses indicate that register X is selected to transmit a word via bus RT2 to register Z. The manner in which these pulses produce the actual read-out command and reset pulses is discussed further in connection with FIGS. 13–16.

After a transmission between two selected registers is completed, control pulse CP3 ends and control pulse CP4 starts. Pulse CP4 is of substantially fixed duration and is applied to the memory 200 to advance it to the next instruction.

If the elements of the system of the present invention are operating properly, the comparison between the bits on a bus such as RT1 with those on a feedback bus such as RT2 should be completed within a given maximum interval of time. If, after that maximum interval has elapsed, W=0 (FIG. 11) does not appear and the control pulse CP3=1 does not terminate, then something is not operating properly in the system. A circuit for indicating such an error is shown in the lower right in FIG. 12. The circuit includes a delay line 270, a comparator 271 and an error indicator 272.

In operation, the control pulse CP3 is applied to the sending end of delay line 270. The comparator 271 has one of its inputs connected to the sending end of the delay line and the other to the receiving end of the delay line. The delay line length is equal to the maximum duration expected for control pulse CP3. If the control pulse is longer than this duration, it appears concurrently at the sending end of the delay line and at the receiving end of the delay line. Under these conditions, the comparator produces an output voltage at lead 273 which is applied to the error indicator 272. The error indicator may be a visual indicator and upon the indication of an error, the computer operator can manually initiate an error checking program routine.

In a large scale practical computer, the error indicator circuits may be more sophisticated than described above. For example, the circuits may initiate a diagnostic routine the purpose of which is first to retry the transmission and then, if this is unsuccessful, to initiate the transmission of various bit patterns in an attempt to localize the error producing element. Since these circuits play no part in the present invention, they are not described further.

Figure 13:
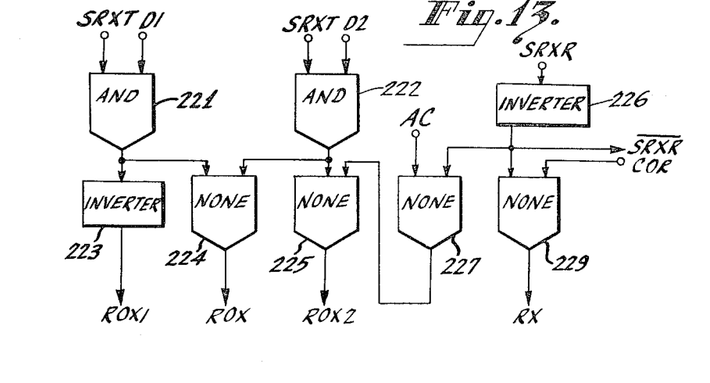

FIG. 13 illustrates the circuit for producing the read-in and read-out command pulses for register X (FIG. 2). The circuit includes two "and" gates 221 and 222. The output of "and" gate 221 is applied to an inverter 223 and "none" gate 224. The output of "and" gate 222 is applied to a "none" gate 225 and to "none" gate 224. The circuit also includes an inverter 226 the output of which is applied to "none" gates 227 and 229.

Figure 14:
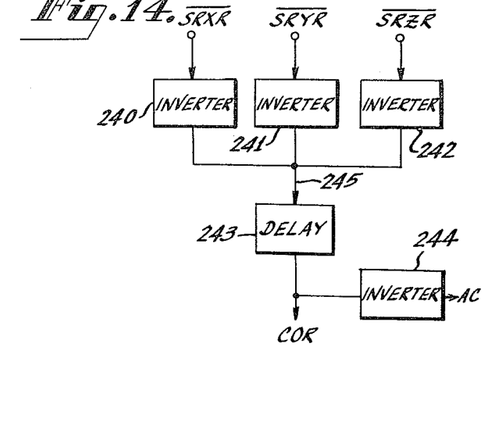

The various outputs and certain of the inputs of the circuit of FIG. 13 are:

ROX1=0—a pulse which commands certain output gates of register X to transmit data to bus RT1
ROX=0—the pulse which commands certain output gates of register X to transmit data to bus T1
ROX2=0—the pulse which commands certain output gates of register X to transmit data to bus RT2
RX=1—the reset pulse for the flip-flops of register X
COR=1—cut-off reset signal—this signal commands the resetting pulse, RX in the present instance, to return to "zero"
AC=0—allow comparison signal—this signal must occur before an output gate of a register can feed information from a register to a feedback bus The circuit for deriving the AC and COR signals is shown in FIG. 14 and is discussed later.

In the circuit of FIG. 13, the D1 and SRXT pulses are applied to "and" gate 221. Thus, this "and" gate produces a "one" output when the X register has been selected to transmit information to the RT1 bus. The function of the inverter 223 is to invert the output so as to produce a ROX1=0 pulse under these conditions. ROX1=0 is an enabling pulse for the output gates of the X register leading to the RT1 bus (see FIG 2).

The SRXT and D2 pulses are applied to "and" gate 222. Thus, this "and" gate produces a "one" output when the X register is selected to transmit data to bus RT2. "And" gates 221 and 222 apply their outputs to "none" gate 224. If any one of the two "and" gates 221 or 222 produces a "one" output, "none" gate 224 produces an ROX=0 output. ROX=0 is an enabling pulse for the output gates of register X which feed the T bus (FIG. 2). It should be recalled in this connection that D1 and D2 are complements so that if the X bus is selected for transmission, it transmits only to the RT1 or the RT2 bus and in either case the "none" gate 224 produces an ROX=0 output. "None" gate 224 produces an ROX=1 output (a disabling pulse for the output gates of the register feeding the T bus) only when both inputs to "none" gate 224 are "zero" and this occurs only when the X register is not selected for transmission.

When the X bus is selected for reception, SRXR=1 is applied to inverter 226. The inverter produces a $\overline{SRXR}$ signal and it is applied to "none" gates 227 and 229. SRXR=1 enables the input gates to the X register. Note in this connection that SRXR=1 enables the input gates to the register (see FIG. 2) since they are "and" gates whereas ROX1=0 enables the output gates of the registers since they are "none" gates.

The COR signal applied to "none" gate 229 is normally a "zero." Accordingly, when the SRXR=1 signal arrives, the "zero" output of inverter 226 produces an RX=1 output at "none" gate 229. RX=1 is a reset signal for the X register. Recapitulating for a moment, when the SRXR signal arrives, it opens the input gates to the X register and "none" gate 229 produces an RX=1 output which resets the flip-flop of the X register.

A short interval after the flip-flops of the register are reset, the COR input signal to "none" gate 229 changes from a "zero" to a "one." This changes RX from "one" to "zero" thereby terminating the resetting action. Thus, the flip-flops of the X register are now reset and the input gates to the X register remain open (SRXR remains "one").

"None" gate 227 receives the $\overline{SRXR}$ signal and the AC signal. AC is normally a "one," however, when any one of the registers is selected to receive data, AC changes to "zero." AC changes to "zero" at the same time that COR changes to "one," that is, as soon as the resetting of the flip-flops of the selected register is completed. In the present instance, the SRXR pulse selects the X register to receive so that AC becomes "zero" when the flip-flops of the X register are reset. Thus "none" gate 227 produces a "one" output when the X register has been selected to receive data and the flip-flops in the X register are reset.

"None" gate 225 receives the outputs of "none" gate 227 and "and" gate 222. It will be recalled that a "one" output appears at "and" gate 222 when the X register has been selected to transmit information to bus RT2. Thus, an ROX2=0 output appears at "none" gate 225 when either the X register has been selected to transmit information to bus RT2 or the X register has been selected to receive information. In the latter connection, it may be seen in FIG. 2 that the X register receives information from bus RT1. It is desired to feed this information back to the RT2 bus for purposes of comparison. The logic circuit just described causes this feedback to occur. When the X register is selected for reception, ROX2 is made equal to "zero." This commands the output gates of the X register leading to bus RT2 to feed back the information received by the X register to bus RT2.

Figure 15:
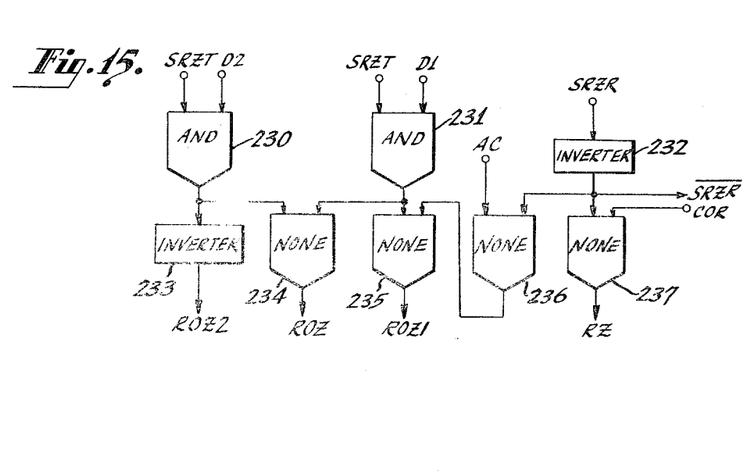

The circuit of FIG. 15 is the control system for register Z. It includes two input "and" gates 230 and 231 and an input inverter 232. "And" gate 230 applies its output to inverter 233 and "none" gate 234. "And" gate 231 applies its output to "none" gate 235 and "none" gate 234. Inverter 232 applies its output to "none" gates 236 and 237. The command pulses shown are:

ROZ2=0—read output from register Z to bus RT2
ROZ=0—read-out from register Z to bus T
ROZ1=0—read-out from register Z to bus RT1
RZ=1—reset the flip-flops of register Z The operation of the circuit of FIG. 15 is in many respects similar to the one of FIG. 13. ROZ2=0 enables the output gates of the Z register leading to bus RT2. ROZ2 is made equal to "zero" when the destination pulse D2 and selection pulse SRZT are both equal to "one."

SRZR enables the input gates to the register. Similarly, the flip-flops of the register are reset by the RZ=1 pulse when the selection pulse SRZR=1 appears. The reset action is terminated shortly thereafter when COR changes from "zero" to "one."

ROZ1=0 is an enabling pulse for the output gates of the Z register leading to bus RT1. ROZ1=0 occurs either when the RT1 bus is selected for transmission or the Z register is selected for reception. In the latter connection, it may be seen in FIG. 2 that the Z register receives data from bus RT2. When the data is received and stored in the register, it is desired to feed the data back to the RT1 bus for comparison with the transmitted data. The circuit of FIG. 15 causes this feedback since under these conditions the ROZ1=0 pulse occurs and enables the output gates of the Z register leading to the RT2 bus.

Figure 16:
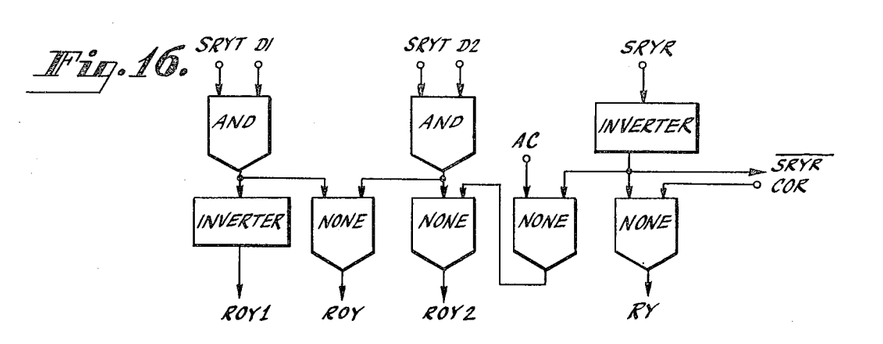

The circuit of FIG. 16 is quite similar to the one of FIG. 15 and operates in the same manner. Accordingly, the operation need not be discussed in detail. The circuit of FIG. 16 produces the read-in and read-out command pulses for the Y register. The capital letters designating these pulses are also self-explanatory.

The circuit of FIG. 14 is the one that produces the allow comparison (AC) and cut off reset (COR) pulses. The circuit includes inverters 240, 241 and 242, the outputs of which are applied to a delay line 243. The delay line applies its output to an inverter 244.

The three input inverters receive the $\overline{SRXR}$, $\overline{SRYR}$ and $\overline{SRZR}$ selection pulses, respectively. Thus, when any one of the three registers is selected to receive data, a "one" appears at common output lead 245. This "one" is delayed and, after the delay interval, appears as the cut-off reset pulse COR. It may be recalled that COR=1 disables the "none" gates of the circuits of FIGS. 13, 15 and 16 to which it is applied and this terminates the resetting action. The COR signal is inverted by stage 244 and appears as an AC=0 signal. Again, this is the signal which is applied to a "none" gate in the circuits of FIGS. 13, 15 and 16 and its purpose is to enable the "none" gate after the resetting action is completed.

CONTROL PULSE GENERATOR

Figure 17:
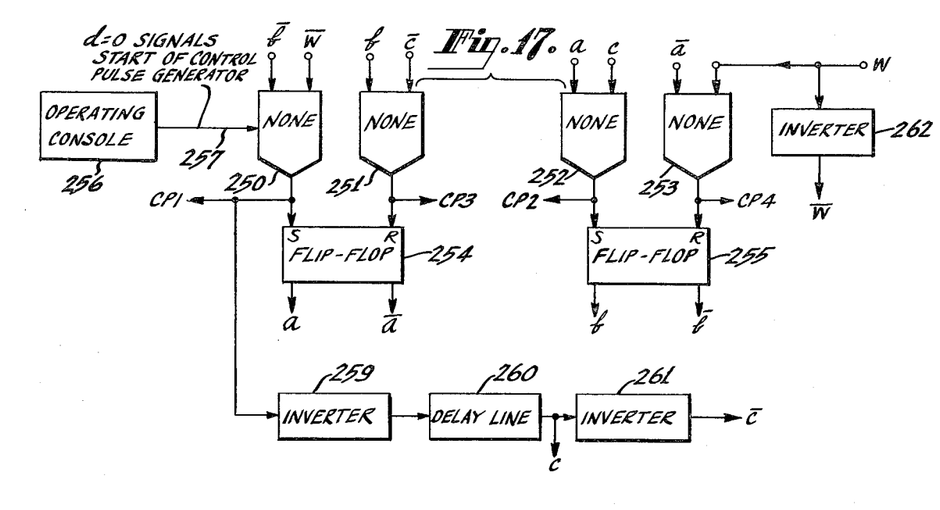
FIG. 17 is a block circuit diagram of a control pulse generator suitable for the present invention.

A simplified form of a control pulse generator which may be used with the circuits described in detail above is shown in FIG. 17. The circuit includes four "none" gates 250–253, inclusive. Two are connected to flip-flop 254 and the other two are connected to flip-flop 255. The flip-flops are of the type which, when reset, produce a "one" output at the unbarred output terminal and, when set, produce a "one" output at the barred output terminal.

The pulse generator is started by applying a $d=0$ signal from an operating console 256 via lead 257 to one of the inputs to "none" gate 250. The control pulses CP1 through CP4 are available at the outputs of the four "none" gates. Control pulse CP1 is applied via lead 258 to inverter 259. The inverter output is applied through a delay line 260 to a second inverter 261. A third inverter 262 shown at the upper right inverts the W signal.

The flips-flops 254 and 255 are initially assumed to be reset. Thus, a $a=1$, $\bar{a}=0$, $b=1$, and $\bar{b}=0$. W, the signal supplied by delay circuit 28 (FIG. 1 and FIG. 11), is normally a "one." When the transfer of information is completed, W changes to "zero." Before the generator starts, CP1–CP4 are all "zero," therefore, $c$ is normally "one" and $\bar{c}$ is normally "zero."

In operation, the $\bar{b}$ and $\overline{W}$ inputs to "none" gate 250 are normally "zero." The operating console 256 quiescently applies a $d=1$ output to the third input to "none" gate 250. To start the generator, the operating console changes its output to $d=0$. The output of "none" gate 25 therefore changes from a "zero" to "one," that is, CP1 becomes "one." When CP1=1, flip-flop 254 becomes set and $a$ changes to "zero" and $\bar{a}$ to "one."

After an interval of time equal to the delay imparted by delay line 260, $c$ changes from "one" to "zero" and $\bar{c}$ changes from "zero" to "one." The two inputs to "none" gate 252 are therefore now "zero" ($\bar{c}=0$ and $a=0$). Accordingly, "none" gate 252 produces a CP2=1 output.

When CP2 changes to "one," flip-flop 255 is set, $b$ changes to "one," and this inactivates "none" gate 250. Accordingly, CP1 terminates, that is, changes back to "zero."

After an interval of time equal to the delay imparted by the delay line 260, the lagging edge of CP1 passes through delay line 260 and $c$ changes from "zero" back to "one." This inactivates gate 252 and control pulse CP2 terminates. At the same time $\bar{c}$ changes to "zero" so that both inputs to "none" gate 251 are "zero." "None" gate 251 now conducts and control pulse CP3 starts. Control pulse CP3 resets flip-flop 254 producing an $\bar{a}=0$ output.

As already mentioned, W is normally a "one." After the completion of the data transfer between registers, W changes to a "zero." The two inputs to "none" gate 253 are now both "zero" and a CP4=1 pulse starts. Control pulse CP4 resets flip-flop 255 changing the $b$ output thereof to "one." This inactivates "none" gate 251 terminating control pulse CP3.

When control pulse CP3 terminates, the read-in and read-out command pulses applied to the input and output gates of the registers inactivate these input and output gates. When the input and output gates are inactivated, the digits on the RT1 and RT2 buses all become "zero," and the output of comparator 226 (FIG. 11) changes from W=0 to W=1. W=1 inhibits "none" gate 253 and control pulse CP4 terminates.

It will be recalled that control pulse CP4 advances the program memory 200 (FIG. 4) to the next instruction. If a $d=0$ pulse is still applied to lead 257 (FIG. 17), the control pulse cycle described above repeats.

What is claimed is:

In a data processing system, a plurality of registers among which it is desired to communicate; a plurality of buses; means for applying signals indicative of the information and parity binary bits of a word stored in a selected first one of the registers to a first of the buses and signals indicative of the complement of the word to a second of the buses; a missing bit detection system connected to said first and second buses for producing an inhibit signal in response to corresponding, non-complementary information bits on said two buses and an inhibit signal in response to non-complementary parity bits on said two buses; a parity check circuit connected to said first bus for checking the parity of the word transmitted on the bus for producing an inhibit signal either when parity is incorrect or when the parity check is not completed; means for applying the signals on the first bus to a selected second one of said registers; means for feeding back the signals received by said second register to a third one of said buses; and means connected to said missing bit system, said parity check circuit and said first and third buses for terminating the application of signals to said buses and for terminating the reception of signals by said second register in response to equality of the words on said first and third buses and the absence of inhibit signals from said missing bit system and said parity check circuit.

(References on following page)

References Cited by the Examiner

UNITED STATES PATENTS

| | | |
|---|---|---|
| 2,281,745 | 5/1942 | Buckingham. |
| 2,512,038 | 6/1950 | Potts. |
| 2,689,950 | 9/1954 | Bayliss et al. |
| 2,939,116 | 4/1956 | Burns et al. _________ 340—174 |
| 2,923,817 | 2/1960 | Wanlass _____________ 328—92 |
| 2,942,192 | 6/1960 | Lewis _______________ 328—92 |
| 2,958,072 | 10/1960 | Batley ______________ 340—147 |
| 2,961,643 | 11/1960 | Ayres et al. |
| 2,969,522 | 1/1961 | Crosby ______________ 340—175 |
| 3,063,636 | 11/1962 | Sierra ______________ 235—153 |

OTHER REFERENCES

Pages 147–160, Apr. 1950 publication: The Bell Technical Journal, vol. 29.

Pages 74–85, Apr. 1959, publication: I. R. E. Transactions on Vehicular Communications.

Pages 18 and 19, Dec. 1958, Pomerene, Register Transfer Check IBM Technical Disclosure Bulletin, vol. 1, No. 4.

ROBERT C. BAILEY, *Primary Examiner.*

IRVING L. SRAGOW, MALCOLM A. MORRISON,
*Examiners.*